United States Patent [19]

Huber

[11] Patent Number: 5,792,290
[45] Date of Patent: Aug. 11, 1998

[54] METHOD FOR EXACTLY SEPARATING A MATERIAL CONNECTED IN A WEB-LIKE MANNER ALONG ITS CONTOURS

[75] Inventor: Reinhard Huber, Freudenstadt, Germany

[73] Assignee: Robert Burkle GmbH & Co., Freudenstadt, Germany

[21] Appl. No.: 707,459

[22] Filed: Sep. 4, 1996

[51] Int. Cl.⁶ .............................. B26D 5/00; B32B 31/00
[52] U.S. Cl. ..................... 156/64; 156/353; 83/359; 250/559.19; 250/559.22; 250/559.06
[58] Field of Search ................ 156/64, 353; 83/73, 83/359; 250/559.01, 559.04, 559.06, 559.19, 559.22; 364/468.25, 468.26

[56] References Cited

U.S. PATENT DOCUMENTS

| | | | |
|---|---|---|---|
| 4,187,132 | 2/1980 | Dijk et al. | 156/353 X |
| 4,580,580 | 4/1986 | Kjaer et al. | 83/73 X |
| 5,045,135 | 9/1991 | Meissner et al. | 156/64 |
| 5,202,557 | 4/1993 | Robertson | 250/559.19 X |
| 5,351,126 | 9/1994 | Takada et al. | 250/559.22 X |

FOREIGN PATENT DOCUMENTS

| | | |
|---|---|---|
| 35 14389 A1 | 10/1986 | Germany. |
| 42 42 702 A1 | 7/1993 | Germany. |

*Primary Examiner*—David A. Simmons
*Assistant Examiner*—Paul M. Rivard
*Attorney, Agent, or Firm*—Pillsbury Madison & Sutro LLP

[57] ABSTRACT

A method and system for separating component which have two opposed sides and an edge between the opposed sides and are initially connected together by a foil which contacts one of the sides of each component, by: disposing the components and the foil so that portions of the foil which are disposed between components are disposed at an elevation different from the other one of the sides of each component; disposing a scanner to monitor the elevations of the foil and the other one of the sides of each component and monitoring the elevations with the scanner; and converting the monitoring result into data for controlling cutting of the foil along the edge of each component.

17 Claims, 2 Drawing Sheets

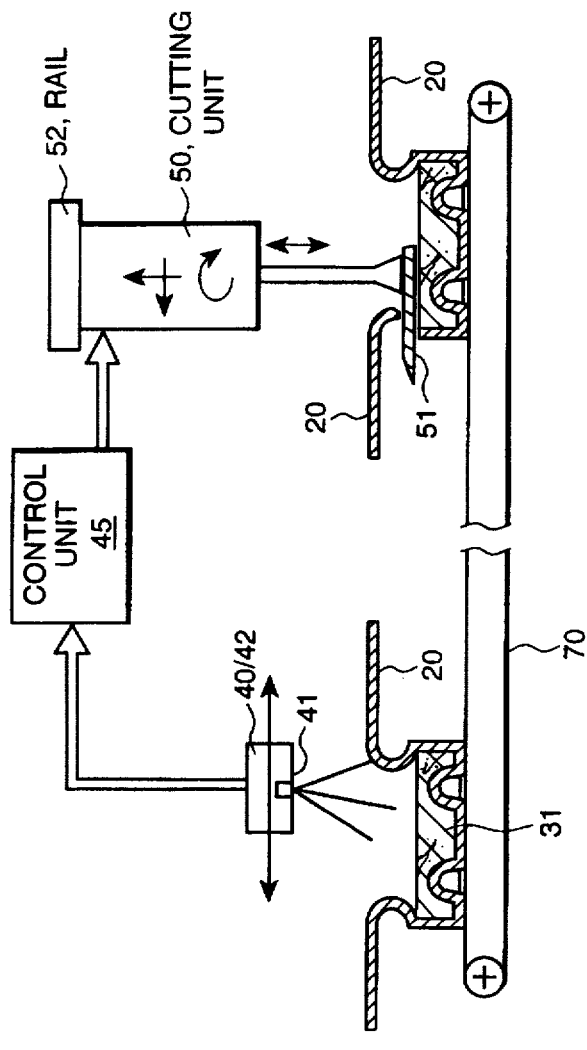
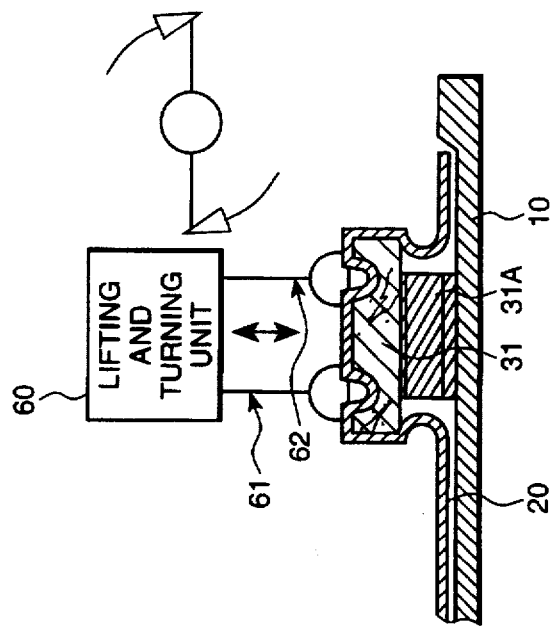

METHOD FOR EXACTLY SEPARATING A MATERIAL CONNECTED IN A WEB-LIKE MANNER ALONG ITS CONTOURS

BACKGROUND OF THE INVENTION

1. Field of the Invention

The invention relates to a method for exactly separating components connected in a web-like manner along their contours into several blanks with defined cutting lines, employing a scanner to detect the structure of the material, and for deriving cutting criteria from data obtained by the scanner for controlling a downstream connected cutting unit. The blanks may be, for example, furniture components.

2. Prior Art

A method of this type is known, for example, from German Patent Publications DE 42 42 702 A1 and DE 35 14 389 A1.

The purpose of the instant method is to separate furniture components which have been covered with a common foil, for example by means of a press, and to cut out the foil exactly around the edges of the components. As a rule, the furniture components, for example the fronts of pieces of furniture, are located on a common placement palette, which is designed in accordance with the available press. Depending on the size of the furniture components to be covered, for example doors, several furniture components are fitted into such a placement palette and are together subsequently covered with the common foil in the press, in particular by the application of heat and pressure. After leaving the press, separation initially starts by coarsely cutting the individual furniture components out of the entire foil and then supplying them to an automatic cutting device which can detect the length and width of the furniture components and then cut the components out exactly along their contours, so that the foil then terminates exactly with the respective edges of the furniture components. These operating steps are labor-intensive, since the coarse separation and the transport to the cutting device must be manually performed, which is expensive in respect to time and costs.

The above-cited patent publications have in common that the methods disclosed therein assume a web-shaped, connected material which is either a woven textile (De 42 42 702) or a paper web (DE 35 14 389). Thus, both technologies are concerned with scanning a two-dimensional structure, for which there are a multitude of possibilities, which are listed in the introductory portion of DE 42 42 702 A1. In the course of this it is necessarily required to employ an expensive optical scanner, which is the only possibility for detecting planar structures of the types disclosed in the above-cited patent publications. In contrast thereto, the method in accordance with the invention starts with a web-like connected material consisting of a common foil extending over a plurality of components to be separated, so that one side the material to be separated has, in common with the cited publications, a two-dimensional surface at the top of the common foil, while on the back, the common foil has a height-structured surface, namely at the back of the furniture components and the "lower" placed back of the common foil.

In contrast to the technical teaching in accordance with the cited publications, the common foil of three-dimensional components does not offer "cutting criteria", which for example might consist of a recognizable pattern or an identifiable symbol, from which the cutting information could be obtained.

OBJECT AND SUMMARY OF THE INVENTION

It is an object of the invention to perform the described separation and cutting exactly in accordance with the contours, even of three-dimensional components, such as individual furniture components in a more rational, simple and inexpensive manner.

The above and other objects are achieved, in accordance with the invention, in a method for separating components which have two opposed sides and an edge between the opposed sides and are initially connected together by a foil which contacts one of the sides of each component, by the improvement comprising: disposing the components and the foil so that portions of the foil which are disposed between components are disposed at an elevation different from the other one of the sides of each component; disposing a scanner to monitor the elevations of the foil and the other one of the sides of each component and monitoring the elevations with the scanner; and converting the monitoring result into data for controlling cutting of the foil along the edge of each component.

In the practice of the invention, scanning for obtaining cutting information and to control the downstream connected cutting unit takes place from the back of the web-like connected material, wherein the height structure of this side is selected to provide definite cutting criteria. Thus, the scanner employed has to be able to recognize the topography of this side of the web-like connected material, which can preferably be achieved in a contactless manner, for example by a reflection method, but theoretically can also take place mechanically, for example by means of feelers, which dip into the gaps, or ride over the elevations, between the furniture components and provide this information as control information.

The basic concept of the invention therefore includes the automation of the described steps, up to now performed manually, by the interposition of a transport device between the outlet of the press and the cutting unit, and scanning of individual components in such a way that the topography of the surface placed underneath it is supplied to the scanning device and that in this way the exact position determination of the individual components on the common foil is possible. The control of the downstream connected cutting unit is possible in a simple way on the basis of the position information which the scanner receives when the placement palette leaves, so that the process steps explained at the outset can be fully automated with a relatively small investment.

One exemplary, nonlimiting embodiment will be described with reference to the following drawings.

BRIEF DESCRIPTION OF THE DRAWINGS

FIG. 2A is a cross-sectional view along line X—X of FIG. 1A.

FIG. 2B is a side elevational view of a system for processing components according to the invention.

DESCRIPTION OF THE PREFERRED EMBODIMENTS

Figure 1A:
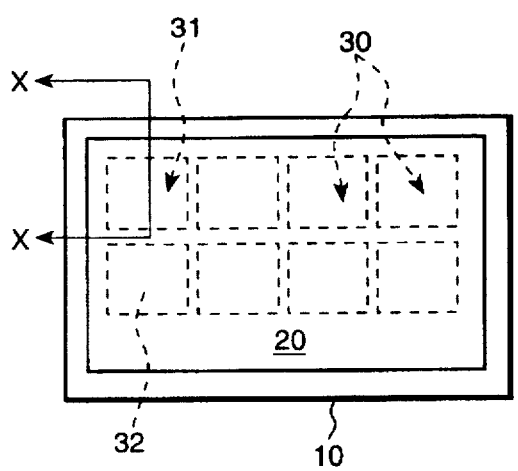
FIGS. 1A, 1B, 1C and 1D are schematic top plan views showing the arrangement of individual components and a foil during different stages of a method according to the invention.

FIG. 1A is a top plan view showing a total of eight individual components 30, 31, for example front panels of pieces of furniture, which are arranged inside a common placement palette 10 on bottom parts of the palette, for example part 31A, shown in FIG. 2A, and covered with a common foil 20. The processes for covering these pieces of furniture, for example by means of a vacuum press, are a part of the prior art and need not be explained here. For example, the state shown in FIG. 1A represents the situation following the removal from such a vacuum press. The foil blank 20 therefore extends over all (eight in the exemplary embodiment) individual components 30, 31 and projects beyond the edges of the group of components to a greater or lesser extent.

Figure 1B:
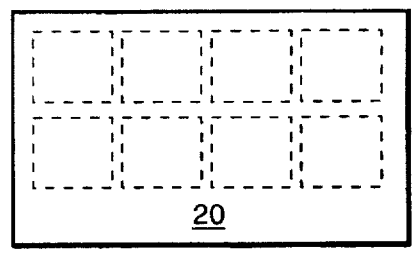
Figure 1C:
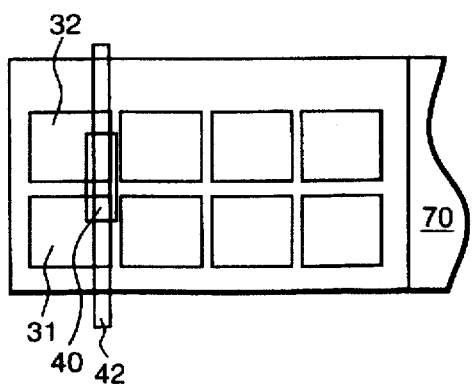

By means of a lifting and turning unit 60 with suction cups 61, 62, shown schematically in FIG. 2A, the furniture components are picked up and the entire unit of furniture components and foil is first lifted out of the placement palette 10, so that it will then appear as shown in FIG. 1B. Subsequently this unit is rotated by 180° around a horizontal axis parallel between FIGS. 1A/B and C/D. For example, this axis may be horizontal relative to FIGS. 1 and perpendicular to the plane of FIG. 2A. After such rotation, the surfaces of the furniture pieces, e.g. part 31 represented in the exemplary embodiment, which originally faced downward now faces upward, and the turned unit is then lowered onto a transport device 70, such as a conveyor belt, so that the state represented in FIG. 1C and FIG. 2B arises.

A scanner 40 with a scanning unit 41, for example a photo-diode which receives reflected light, is now displaced on a rail 42 above this arrangement, in a horizontal direction perpendicular to the conveying direction of device 70, in such a way that, together with the forward movement of the transport device 70, the entire unit of foil and furniture components is sequentially scanned. The reflected light can be measured by means of suitable, conventional receiver devices (not shown) in the scanner 40, and the surface structure of the foil and the undersides of the furniture components, i.e. the surfaces which originally faced downwardly, can be detected in this way. In other words, the topography of the unit of foil and furniture components can be identified. If needed, scanner 40 can also be equipped with an appropriate source of light which will be reflected from foil 20 and components 30, 31 to scanning unit 41.

The topographic information is obtained on the basis of the measured signals of the scanner 40 in a control unit 45, which can be constructed according to principles well known in the art. A "height image" of the surface of the foil and the furniture components scanned by the scanner 40 is successively composed by image rows and columns of a video image in the control unit 45. From this height image it is now easily possible to deduce the position of the individual components 30, i.e. the respectively desired coordinates, for example the center of the piece of furniture or the direction of an edge, which are required to cut the foil on each furniture piece exactly flush with the underside of the piece of furniture, which is the surface now facing upward.

Figure 1D:
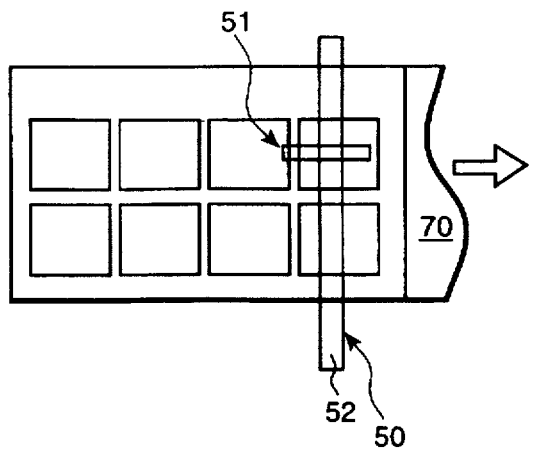

Thus the control unit 45 obtains control information from the height structure of the unit of foil and furniture pieces for a downstream connected cutting unit 50, which is displaceable along a horizontal rail 52 perpendicular to the conveying direction of the transport device 70. This cutting unit 50 has a cutter unit 51 which is mounted to be in adjustable in height and in the conveying direction of device 70, and to be rotatable, about a vertical axis, on the cutting unit 50. On the basis of control signals from the control unit 45 it is now possible, for example, to lower cutter unit 51 onto the center area of a furniture component, for example, and then to displace unit 51 along calculated edge coordinates of the furniture component, in the process of which the foil is separated, such as schematically represented in FIGS. 1D and 2B.

In this way, full automation of all processing steps from leaving the press until the separation of the finished, edge-cut furniture components is possible, in particular including the cutting of the individual components out of the common foil exactly along their contours.

Techniques for controlling the path of movement of a cutter based on topographic data are, of course, well known in the art.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. In a method for separating flat components which have two opposed sides and an edge between the opposed sides and are initially connected together by a foil which contacts one of the sides of each component, the improvement comprising:

disposing the components and the foil so that the other one of each side of each component is uncovered and portions of the foil which are disposed between components are disposed at an elevation different from the other one of the sides of each component;

disposing a scanner to monitor the elevations for the foil and the other one of the sides of each component and monitoring the elevations with the scanner to produce a monitoring result identifying the position of each component; and converting the monitoring result into data for controlling cutting of the foil along the edge of each component.

2. The method defined in claim 1 comprising the preliminary step of placing the foil on top of the components and attaching the foil to the components in a press, and wherein said step of disposing comprises inverting the foil and attached components and placing the inverted foil and attached components on a transport device.

3. The method defined in claim 2 wherein during said preliminary step of placing and attaching, the components are held on a placement palette.

4. The method defined in claim 3 wherein, during said monitoring operation, the components are located between the foil and the scanner.

5. The method defined in claim 4 wherein the scanner scans a succession of points in a raster pattern.

6. The method defined in claim 5 wherein the scanner operates by measuring light reflected from the components and the foil.

7. The method of claim 6 wherein the scanner includes a light emitter and a reflected light detector.

8. The method defined in claim 1 wherein, during said monitoring operation, the components are located between the foil and the scanner.

9. The method defined in claim 1 wherein the scanner scans a succession of points in a raster pattern.

10. The method defined in claim 9 wherein the scanner operates by measuring light reflected from the components and the foil.

11. The method of claim 10 wherein the scanner includes a light emitter and a reflected light detector.

12. A system for separating flat components which have two opposed sides and an edge between the opposed sides and are initially connected together by a foil which contacts one of the sides of each component, comprising:

means for supporting the components and the foil so that the other one of each side of each component is uncovered and portions of the foil which are disposed between components are disposed at an elevation different from the other one of the sides of each component;

a scanner positioned for monitoring the elevations of the foil and the other one of the sides of each component to produce a monitoring result identifying the position of each component; and means for converting the monitoring result into data for controlling cutting of the foil along the edge of each component.

13. The method defined in claim 1 further comprising cutting the foil along the edge of each component to separate each component from all foil portions which are disposed at the elevation different from the elevation of the other one of the sides of each component.

14. The method defined in claim 1 wherein the step of scanning comprises measuring light reflected from the components and the foil.

15. The system defined in claim 12 further comprising means for cutting the foil along the edge of each component to separate each component from all foil portions which are disposed at the elevation different from the elevation of the other one of the sides of each component.

16. The system defined in claim 12 wherein the scanner comprises means for measuring light reflected from the components and the foil.

17. The system defined in claim 12 wherein the scanner includes a light emitter and a reflected light detector disposed to detect light which has been emitted from the light emitter and reflected from the other one of the sides of each component and the foil.

* * * * *